United States Patent
Apfel et al.

(10) Patent No.: US 8,667,533 B2
(45) Date of Patent: Mar. 4, 2014

(54) CUSTOMIZING STREAMING CONTENT PRESENTATION

(75) Inventors: Darren A. Apfel, Redmond, WA (US); Brian C. McDowell, Woodinville, WA (US); Paolo V. Malabuyo, Bothell, WA (US); Mark J. Weinberg, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 12/765,621

(22) Filed: Apr. 22, 2010

(65) Prior Publication Data

US 2011/0265113 A1    Oct. 27, 2011

(51) Int. Cl.
*H04N 5/445* (2011.01)

(52) U.S. Cl.
USPC .................. 725/38; 725/32; 725/34; 725/138

(58) Field of Classification Search
USPC ......................... 725/32, 34, 138, 38
See application file for complete search history.

(56) References Cited

U.S. PATENT DOCUMENTS

| 5,818,441 | A  | * | 10/1998 | Throckmorton et al. ..... 715/717 |
| 6,018,768 | A  | * | 1/2000  | Ullman et al. ............... 709/218 |
| 6,025,837 | A  | * | 2/2000  | Matthews et al. ............ 715/721 |
| 6,205,485 | B1 | * | 3/2001  | Kikinis ........................ 709/231 |
| 6,415,101 | B1 | * | 7/2002  | deCarmo et al. ............. 386/219 |
| 6,442,755 | B1 | * | 8/2002  | Lemmons et al. ............... 725/47 |
| 6,487,722 | B1 | * | 11/2002 | Okura et al. .................... 725/40 |
| 7,079,176 | B1 | * | 7/2006  | Freeman et al. ........... 348/207.1 |
| 7,080,392 | B1 |   | 7/2006  | Geshwind |
| 7,698,721 | B2 | * | 4/2010  | Sakai .............................. 725/34 |
| 7,716,588 | B2 | * | 5/2010  | Iwamura ....................... 715/736 |
| 7,782,363 | B2 | * | 8/2010  | Ortiz ........................... 348/211.8 |
| 7,966,631 | B2 | * | 6/2011  | Megeid ............................. 725/34 |
| 8,010,987 | B2 | * | 8/2011  | Nygaard et al. .............. 725/105 |
| 8,161,172 | B2 | * | 4/2012  | Reisman ....................... 709/228 |
| 8,442,424 | B2 | * | 5/2013  | Socolof ........................ 455/2.01 |
| 2002/0078006 | A1 | * | 6/2002 | Shteyn .............................. 707/1 |
| 2002/0126991 | A1 | * | 9/2002 | Kawamura et al. ............. 386/70 |
| 2003/0097664 | A1 |   | 5/2003 | Meyers et al. |

(Continued)

FOREIGN PATENT DOCUMENTS

| CN | 1475083 | 2/2004 |
| WO | 0028731 A1 | 5/2000 |

OTHER PUBLICATIONS

Galarneau, Jean-Paul, "Global Marketing of a New Video Technology", Retrieved at<<http://ieeexplore.ieee.org/stamp/stamp.jsp?arnumber=00718172>>, Apr. 1991, pp. 51-53.

(Continued)

*Primary Examiner* — Pankaj Kumar
*Assistant Examiner* — Sahar Baig
(74) *Attorney, Agent, or Firm* — Micah Goldsmith; Micky Minhas; Wolfe-SBMC

(57) ABSTRACT

Streaming content customization techniques are described. In an implementation, metadata, that is associated with an element, is synchronized with a stream of content that includes the element. The element is configured to accept an input to access related content that provides context for a scene that includes the element. After the related content is output, playback of the stream of content is resumed from the point at which the input was accepted to access the related content.

20 Claims, 8 Drawing Sheets

(56) References Cited

U.S. PATENT DOCUMENTS

| | | | |
|---|---|---|---|
| 2005/0213946 A1* | 9/2005 | Braun | 386/105 |
| 2006/0235866 A1* | 10/2006 | Park | 707/101 |
| 2006/0238538 A1* | 10/2006 | Kapler et al. | 345/440 |
| 2008/0010664 A1 | 1/2008 | Pelizza et al. | |
| 2008/0140523 A1* | 6/2008 | Mahoney et al. | 705/14 |
| 2009/0154898 A1 | 6/2009 | Barrett et al. | |
| 2010/0293569 A1* | 11/2010 | Kusumoto et al. | 725/23 |
| 2011/0169913 A1* | 7/2011 | Karaoguz et al. | 348/42 |
| 2011/0209181 A1* | 8/2011 | Gupta et al. | 725/62 |

OTHER PUBLICATIONS

Slot Mijke, "Changing User Roles in ICT Developments; the Case of Digital Television", Retrieved at<<http://www2.warwick.ac.uk/fac/soc/wie/courses/degrees/docs/who/students/edrgaj/research/changing_roles_of_ict_user.pdf>>, 2007, pp. 12.

Lewyn Mark, "Two-Way TV Isn't Quite Ready for Prime Time", Retrieved at<<http://www.businessweek.com/archives/1992/b326125.arc.htm>>, Apr. 13, 1992, pp. 2.

Noam, et al., "Internet Television", Retrieved at<<http://www.kemt.fei.tuke.sk/predmety/KEMT451_TT/FAJCAK/Internet%20Television.pdf>>, 2004, pp. 282.

"Foreign Office Action", Chinese Application No. 201110113791.5, (Jul. 31, 2012), 9 pages.

"Foreign Office Action", Chinese Application No. 201110113791.5, (Jan. 5, 2013), 8 pages.

"Foreign Office Action", Chinese Application No. 201110113791.5, (Jun. 24, 2013), 7 Pages.

* cited by examiner

CUSTOMIZING STREAMING CONTENT PRESENTATION

BACKGROUND

Streaming content, such as movies and television programs, are typically presented in a linear manner. Accordingly, users experience the movie from start to finish following a sequence chosen by the content's creator. In some situations, however, users may become confused by multiple or complex plot lines, non-linear story lines, and so forth. In addition, creators may edit the content to achieve a particular rating, tell a story in a particular way, stay within an allotted time period, fit within a schedule, and so on. For example, a creator may align a high point in a television series with the end of the program's season (e.g., a cliffhanger) to hold the viewer's attention between seasons.

As a result, some users may become disengaged from the content due to lack of some information, failure to appreciate the creator's intent, loss of interest, and so forth. For example, a user may begin watching a television series after several episodes have already aired. Therefore, the user may not understand what occurred in a previous episode. This may lead to user dissatisfaction and limit a creator's audience for the content.

SUMMARY

Streaming content customization techniques are described. In an implementation, metadata, that is associated with an element, is synchronized with a stream of content that includes the element. The element is configured to accept an input to access related content that provides context for a scene that includes the element. After the related content is output, playback of the stream of content is resumed from the point at which the input was accepted to access the related content.

In an implementation, one or more computer readable media comprise instructions that cause the computing system to synchronize metadata associated with an element, that is configured to accept an input, with a stream of content that includes the element. The element is configured to control from what perspective the stream of content is to be output. The stream of content is output from a perspective that was selected responsive to receipt of an input that interacts with the element.

In an implementation, a system includes an interface module and an output module. The interface module is configured to receive an input directed to an element that is included in a stream of content. The element is associated with a behavior that is configured to control which output device a portion of the stream of content is to be directed. The output module is configured to output the portion of the stream of content to an auxiliary output device responsive to receipt of an input. The output module is also configured to synchronize output of the portion of the stream of content with output of one other portion of the stream of content to a primary output device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Users of streaming content may become dissatisfied with a presentation of the stream of content in a single linear manner because it does not engage the user's attention, provide context for the underlying story, and so on. For example, a user may not become engaged with a movie because one character's role is emphasized over another character's role. In another example, a user may dislike the movie because the user missed out on a detail that provides historical context for the rest of the movie. As a result, the users may stop watching the movie.

Customization of streaming content presentation techniques is described to permit users to customize presentation of the stream of content through interaction with an element included in the stream of content. Examples are described in which a user interacts with an element that is associated with metadata that is synchronized with the stream of content. In this way, a user may interact with the element to access a behavior that customizes presentation of the stream of content. For example, a user may click on a character in a movie to listen in on a conversation that includes the character. The user may also select an element to view a flashback that provides context for a current scene.

In the following discussion, an example environment and systems are first described that are operable to customize presentation of a stream of content. Example procedures are also described that may be implemented using the example environment as well as other environments. Accordingly, implementation of the procedures is not limited to the environment and the environment is not limited to implementation of the procedures.

Example Environment

Figure 1:
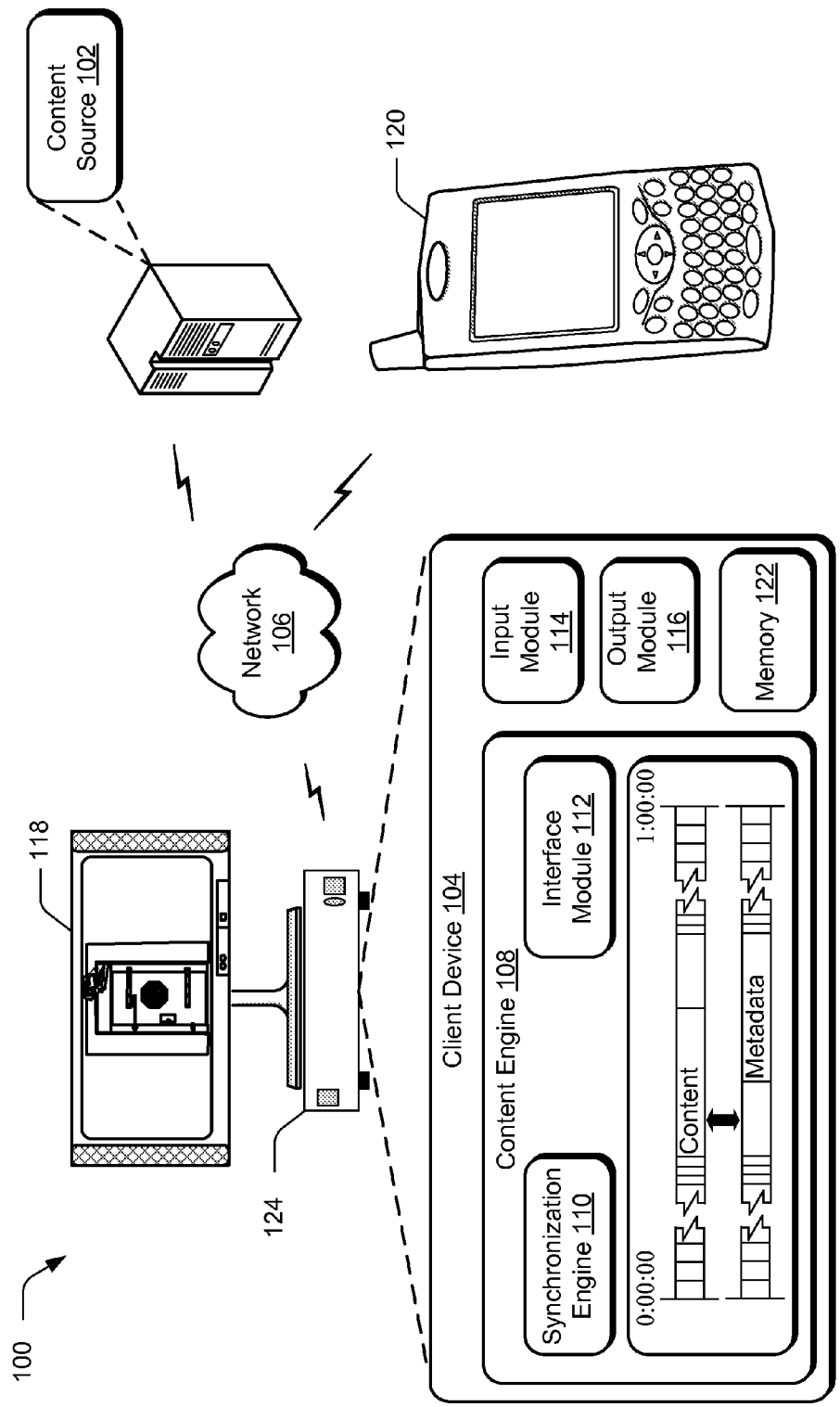
FIG. 1 is an illustration of an environment in an example implementation that is operable to customize presentation of streams of content.

FIG. 1 is an illustration of an environment 100 in an example implementation that is operable to customize presentation of a stream of content. As illustrated, the environment 100 includes a content source 102 and a client device 104 that are communicatively coupled via a network 106, such as the Internet. The content source 102 may be an online source that streams the content to the client device 104. For example, a server may provide content on-demand, e.g., download a movie or program at a client device's request. Although a single content source is illustrated, the content source 102 may represent multiple content sources that act independently or in concert with each other.

The client device 104 may customize output of a stream of content. For example, the client device 104 may include functionality to read a digital versatile disk (DVD) to obtain a stream of content that includes an element that is associated with metadata. The client device 104 may synchronize the metadata with the occurrence of the element in the stream of content so the user can access the element's underlying behavior that is backed by code. For example, a movie may include a scene in which a mobile phone may be selected to view a flashback related to the scene. In this way, the movie's creator can provide related content without interrupting the movie's storyline and users may select whether or not to access the additional content.

The client device 104, as illustrated, includes a content engine 108 with a synchronization engine 110 that is usable to synchronize metadata associated with an element with the stream of content. By synchronizing the metadata with the stream of content, a user may interact with the element to access the element's underlying behavior. Accordingly, the content engine 108 may align metadata for an element with the element's occurrence in the stream so a user can unlock a behavior that causes the client device 104 to perform an action. For example, the appearance of a security camera in a television program may be synchronized with metadata that presents the stream of content from the security camera's perspective. Thus, a user, upon selecting the security camera, may view a scene as if the user was watching the security camera.

The content engine 108 also includes an interface module 112 to receive an input that interacts with an element. In embodiments, the interface module 112 provides an interface layer that overlays the content included in the stream so a user may interact with the element. This permits the user to access related content (e.g., additional content) by entering an input directed to the element. To accomplish this, the interface module may place a box over an element so the user can click on the box to trigger the behavior, e.g., present the additional content. In this way, the content's creator may permit users to access related content, vary what perspective is used to present the content, and so on without creating multiple versions of the content.

The client device 104 of FIG. 1 also includes an input module 114 to accept a user input directed to the element. The input module 114 may be configured to accept user inputs that interact an element to customize presentation of the stream of content. Example interactions include selecting the element, manipulating the element, and so on. Thus, the input module 114 may accept an input from a remote control, a game controller, a visual detection system that detects gestures, and so forth.

The client device 104 also includes an output module 116 to direct output of the stream of content to one or more output devices. For instance, the output module 116 outputs a video portion to a primary output device (e.g., a television 118) while directing another portion of the content to a user's mobile phone 120.

The output module 116 may also be used to synchronize portions of the stream of content with each other. Thus, the output module 116 may align a video portion (e.g., a video feed from a camera) with one or more audio portions (e.g., audio feeds microphones) from the stream. This permits a user to adjust the relative output levels between two or more audio portions to focus on background sounds rather than foreground sounds while remaining synchronized with the video portion.

Memory 122 is also included in the client device 104. The memory 122 may be used to store computer-readable instructions that are used to provide the described modules, engines, behaviors, and so on. In other instances, the memory 122 may be used to store content, such as movies, television programs, audio programs, and so forth. The memory 122 may be representative of multiple memory devices which may include different types of memory, e.g., fixed memory, removable memory, hard drives, random access memory, and so on.

As is to be appreciated, the client device 104 may be embodied in a variety of devices. For example, the client device 104 may be embodied as a set top box 124 that includes functionality to download content such as movies, audio-visual programs, audio programs, web content (e.g., webcasts), and so forth. For example, the client device may be embodied in a satellite box, including a receiver, a cable television box, including a receiver, and so on. While the television 118 is separately illustrated in FIG. 1, in other embodiments, the client device 104 may be integrated with an output device that is used to present the content. Although the client device 104 is illustrated as being co-located with an output device, in other examples the client device 104 may be remote to permit over-the-cloud customization, interaction with an element, and so on.

In embodiments, the network 106 is representative of multiple networks, combinations of sub-networks, and so on. Accordingly, the client device 104 and content source 102 may communicate over the Internet, while the client device 104 and an auxiliary output device communicate over different network, such as a cellular network or a local wireless network. Example networks include the Internet, a cellular telephone network, a local area network (LAN), a wide area network (WAN), a wireless network (e.g., BLUETOOTH (Bluetooth SIG, Inc., Bellevue, Wash.) network), a public telephone network, an intranet, and so on.

As is to be apparent, the client device 104 may access content from a variety of content sources such as cable television systems, over-the-air systems, satellite content systems, online content systems, local memory (e.g., in memory like a hard drive), stored on a removable media (such as a portable hard drive, removable media drive (e.g., DVD), and so forth. While a stream of content is described as coming from a single source, in other examples, the client device 104 can obtain the content from multiple sources that act in concert. For example, the metadata may include a link that directs the client device 104 to the content, e.g., a hypertext markup language (HTML) link to a server that includes the content.

Generally, the functions described herein can be implemented using software, firmware, hardware (e.g., fixed logic circuitry), or a combination of these implementations. The terms "module," "functionality," "service," "engine," "agent," "behavior," and "logic" as used herein generally represent software, firmware, hardware, or a combination of software, firmware, or hardware. In the case of a software implementation, the module, functionality, or logic represents program code (e.g. code) that performs specified tasks when executed on a processor (e.g., CPU or CPUs). The program code may be stored in one or more computer-readable memory devices (e.g., one or more tangible media), such as random access memory (RAM), hard disk memory, and other types of computer-readable storage media, and so on. The structures, functions, approaches, and techniques described herein may be implemented on a variety of commercial computing platforms having a variety of processors.

Processors are not limited by the materials from which it is formed or the processing mechanisms employed therein. For example, the processors may be comprised of semiconductor(s) and/or transistors (e.g., electronic integrated circuits (ICs)).

Having described the environment 100, systems, approaches, techniques and procedures are now described that may make use of the environment 100 and/or different environments. Although headings are included for the reader's convenience, it is to be appreciated that the described structures, techniques, and approaches may be interchanged to accommodate design preferences, and so forth.

Perspective Manipulation Through Use of an Interface Layer

Figure 2:
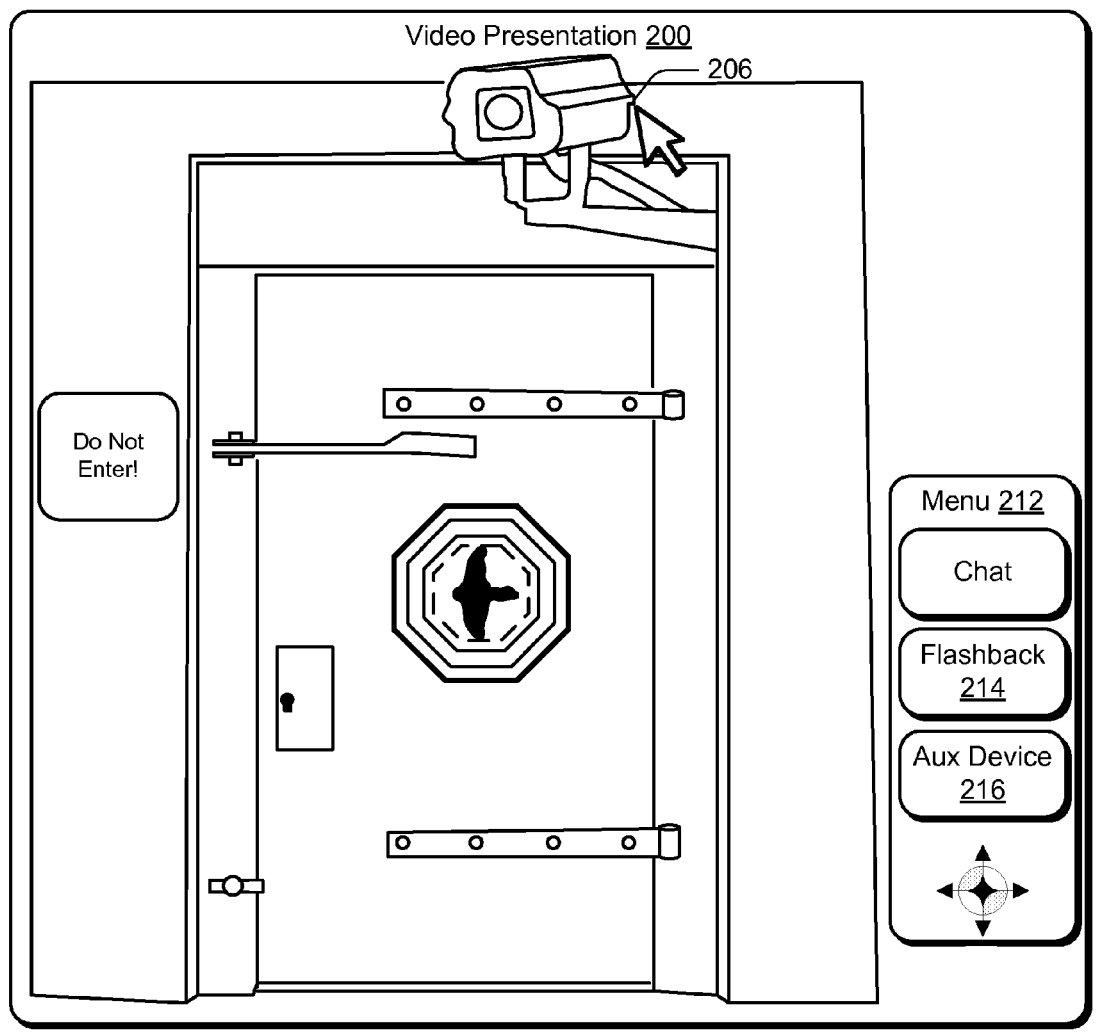
FIG. 2 is an illustration of a sample presentation including an interface layer for interacting with an element.
Figure 2:
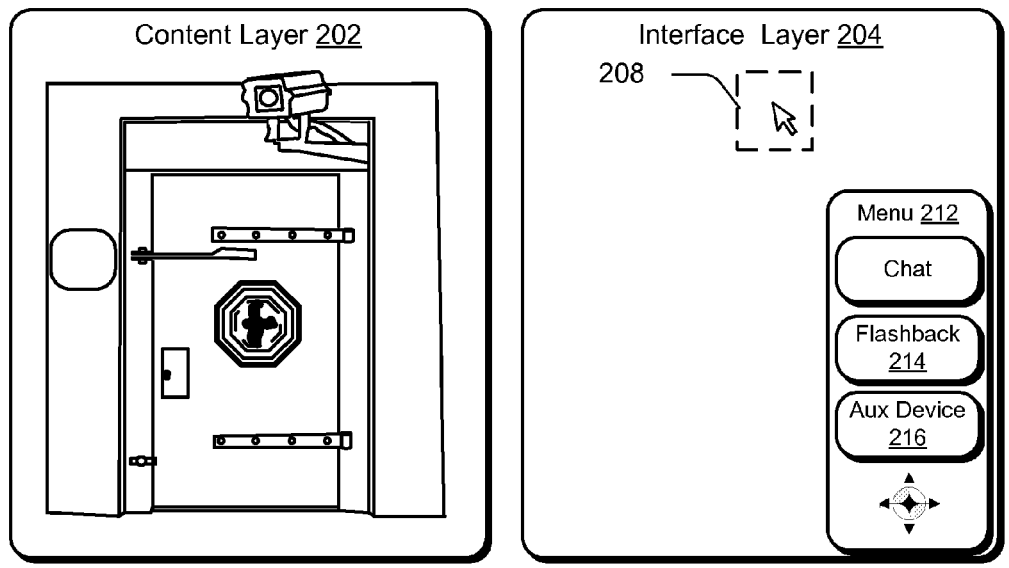

FIG. 2 illustrates an example video presentation 200 including a content layer 202 and an interface layer 204. As illustrated, the content layer 202 is video content for a television program that includes an element, e.g., a security camera 206. The element is associated with metadata that can be used to access the element's underlying behavior.

In this instance, the client device 104 may synchronize the metadata for the security camera 206 to the stream of content so a user can access the security camera's behavior when the security camera 206 occurs in the stream of content. In this way, the user may manipulate the security camera 206 to change what visual perspective is used to present the stream of content. Thus, the user may view the scene from the security camera's perspective (e.g., a video taken by the security camera 206 which is shown in presentation 302 of FIG. 3) rather than viewing the scene from an over-the-shoulder perspective shown in FIG. 2.

In other instances, the client device 104 presents the stream of content from one of the character's a perspective. For instance, a user can follow a scene from Bob's or Kevin's perspective rather than following the scene from a general perspective. Thus, the stream of content is presented from a camera angle associated with the character (e.g., a first person perspective) or the presentation follows selected character.

In embodiments, interaction with an element results in output of content, that absent user selection, is not output by the client device 104. In other words, although a user may click on a element to listen to an alternate audio feed, the alternate audio feed is not typically output for presentation. In this way, the content's creator may include addition content without creating multiple versions of the content or going over an allotted timeframe.

In FIG. 2, the security camera 206 is associated with an area (e.g., a click box 208 of the interface layer) that allows a user to manipulate the security camera 206. The click box 208 is bounded by a dashed line for illustrative purposes only. By interacting with the click box 208, a user may access the behavior associated with for the security camera 206. For example, the behavior is referenced by metadata for the security camera 206. Accordingly, a user may unlock the security camera's behavior, such as zooming the security camera 206 in or out, changing the security camera's angle, listening to different audio feeds for the scene, and so forth. As a result, the user may manipulate the security camera 206 to focus in on an object in background instead of viewing a wider angle.

The interface module 112, in the illustrated embodiment, may provide a GUI, such as a menu 212, to access a flashback that provides historical context for a current scene, direct content to an auxiliary output device, and so on. Thus, a user may click on a flashback button 214 to view a scene from a previous episode or click on an auxiliary output button 216 to hear a telephone call on the user's mobile phone 120.

Figure 3:
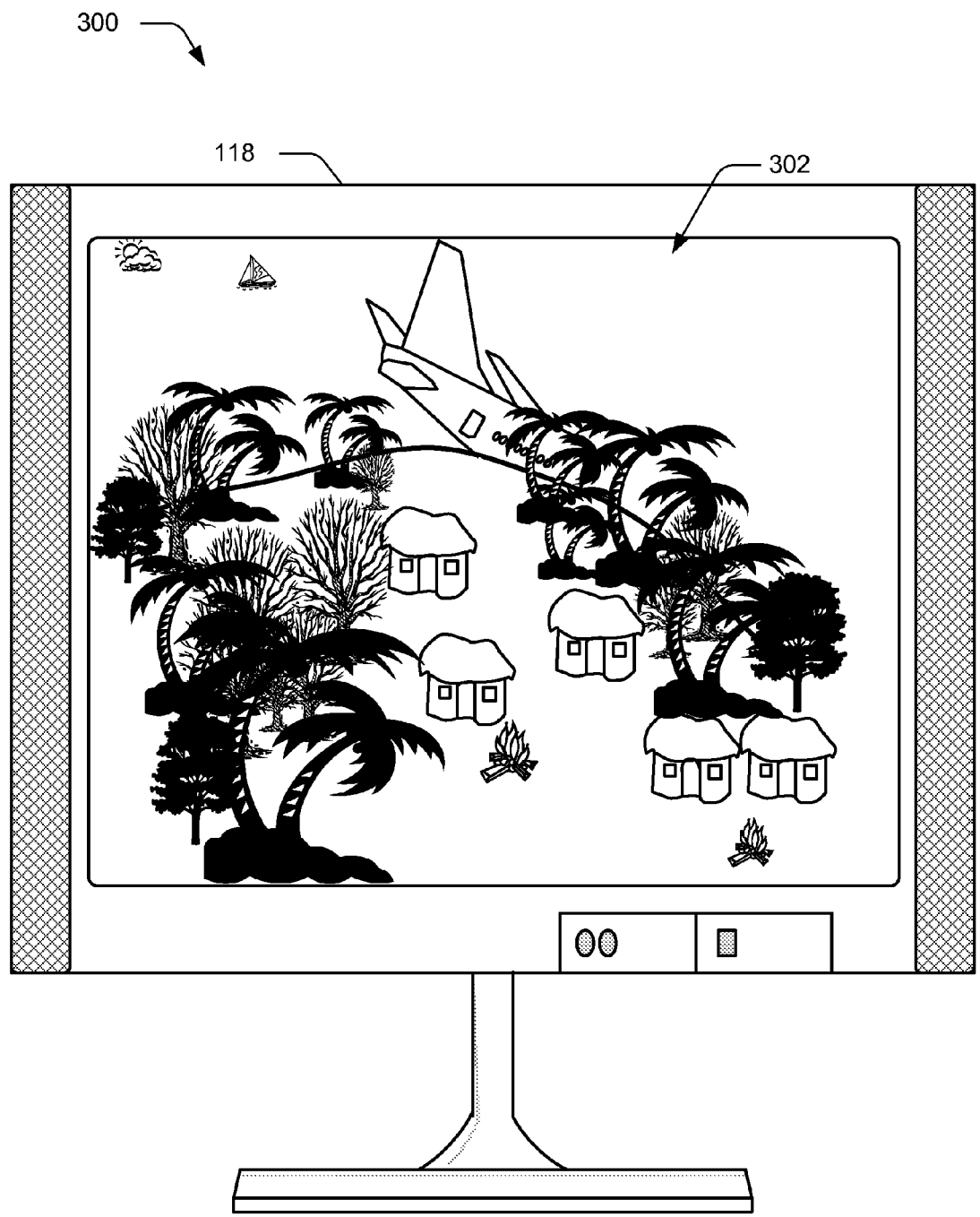
FIG. 3 is an illustration of a presentation of content that is customized through interaction with an element included in a stream of content.

Example procedures are now discussed that may implement the client device 104, as well as, the techniques and approaches described in conjunction with FIGS. 1-3. The client device 104 may also use the procedures described below.

The following discussion describes procedures that may be implemented utilizing the previously described systems, techniques, approaches, services, and modules. Aspects of each of the procedures may be implemented in hardware, firmware, software, or a combination thereof. The procedures are shown as a set of blocks that specify operations performed by one or more devices (e.g., computing systems) and are not necessarily limited to the orders shown for performing the operations by the respective blocks. In portions of the following discussion, reference will be made to the environment 100 of FIG. 1.

Figure 4:
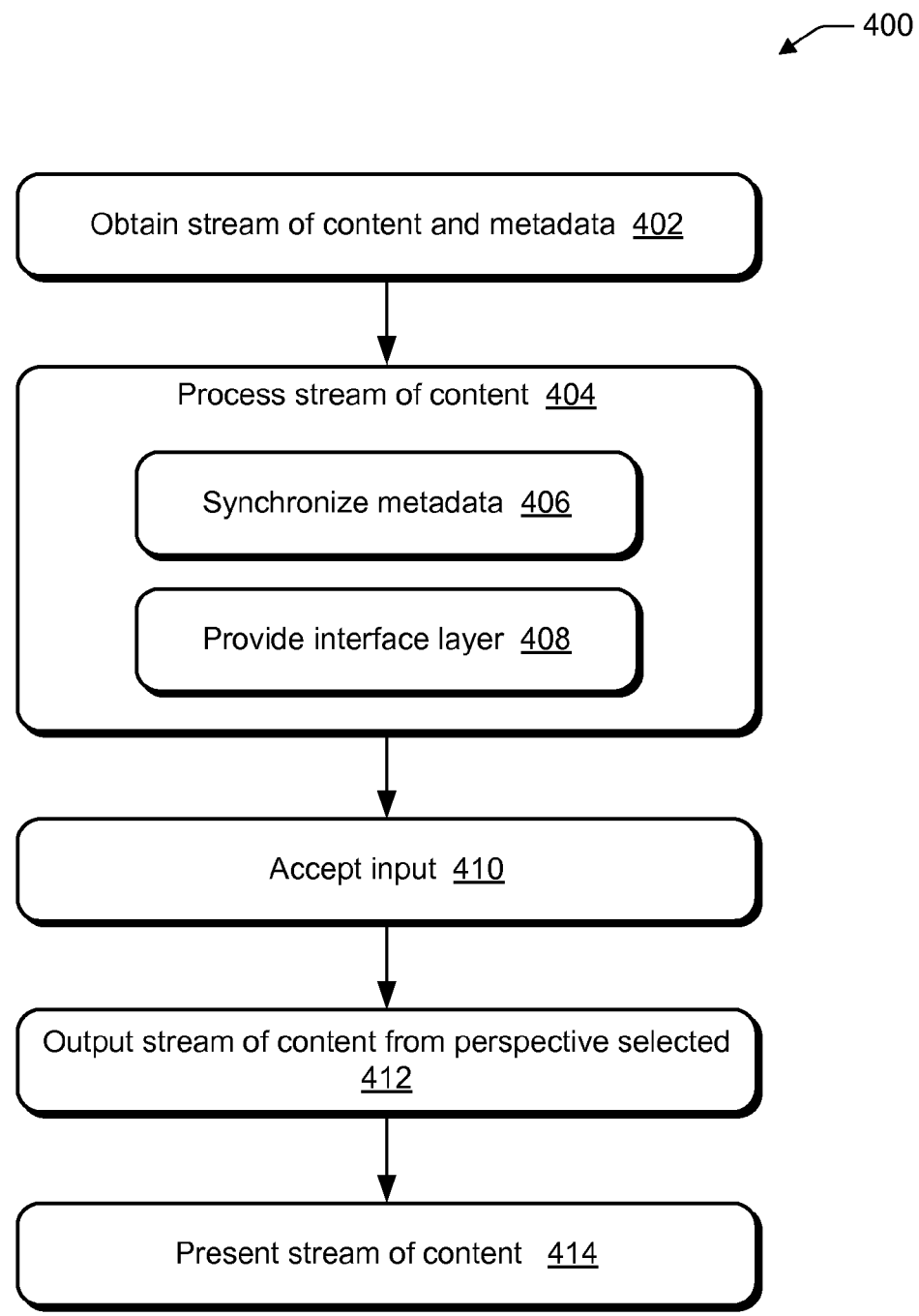
FIG. 4 is a flow diagram depicting a procedure in an example implementation for interacting with an element to customize presentation of a stream of content.

FIG. 4 depicts a procedure 400 for controlling output of a stream of content. For example, a user may interact with an element included in the stream of content to control how the stream of content is output for presentation. The element may be associated with metadata that is synchronized to the stream of content so a user may select the element to access a behavior.

The stream of content including metadata is obtained from a source (block 402). The stream of content may be obtained from a variety of sources, including but not limited to, online systems, local memory, satellite systems, cable television systems, or removable media. The content included in the stream of content may be downloaded, streamed to the device over a period of time, and so on.

The stream of content is processed (block 404). In embodiments, processing includes synchronizing metadata for an element with the stream of content (block 406) and/or providing an interface layer that overlays the content (block 408).

Upon downloading a movie, the synchronization engine 110 may synchronize metadata for an element with the element's occurrence in the stream of content. In this way, when the element is output, a user may access the behavior associated with the element through use of the metadata.

The interface layer is provided over the content so a user may interact with the element. Thus, a user may manipulate a box, in the interface layer over the element, to access the element's behavior. This may permit a user to click on a group of characters having a discussion to listen in on the conversation.

An input is accepted that interacts with an element (block 410). In an embodiment, the interface layer is configured so a user can select a phone to listen in on both sides of a telephone conversation—typical playback of the content may present but one-half of the conversation.

The stream of content is output from the perspective selected (block 412). For instance, if the input manipulates the security camera's angle, the client device 104 outputs the stream of content from the selected perspective. Example perspectives may include visual perspectives (such as a camera angle or following a character), audio perspectives, and so on.

The stream of content is presented on the output device from the selected perspective (block 414). Accordingly, a user may customize how the stream of content is presented by the output device. This may permit a user to follow a selected character in a movie, switch camera angles, listen to different audio feeds, and so forth.

Having described customizing what perspective is used to output content and use of an interface layer, embodiments describing use of an auxiliary output device are now described. It is to be appreciated that the structures, approaches, procedures, and techniques described with respect to FIGS. 1-4 may be used in conjunction with those below.

Content Presentation Using an Auxiliary Output Device

Figure 5:
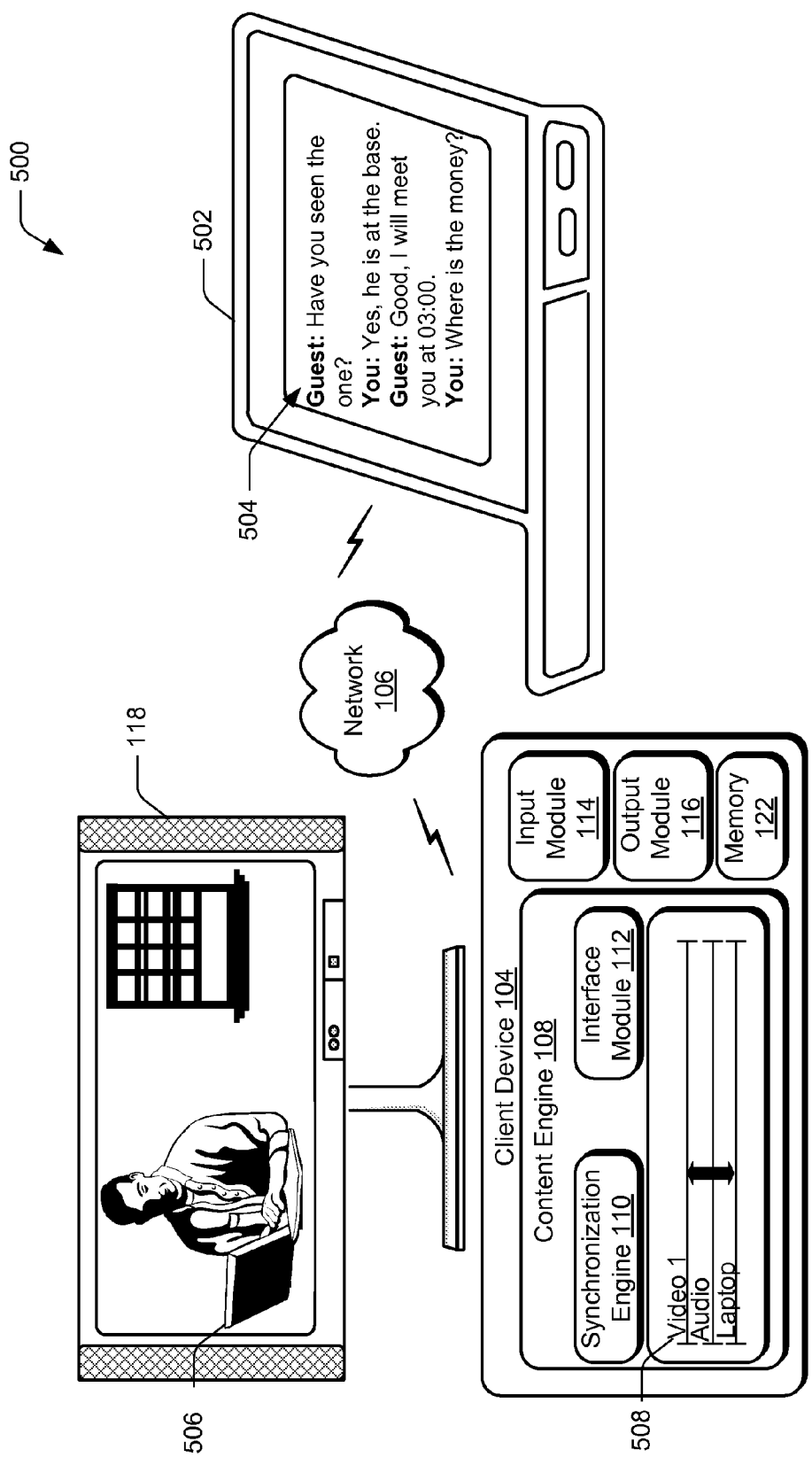
FIG. 5 is an illustration of a system that is used to output a portion of a stream of content to an auxiliary output device.

FIG. 5 illustrates a system 500 including a client device 104 that outputs a portion of a stream of content to an auxiliary output device. The system 500 includes a laptop computer (e.g., a user's laptop 502) that is coupled to the client device 104 by the network 106, such a wireless LAN. As illustrated, the client device 104 outputs a portion of the stream of content (e.g., an online chat) for presentation the user's laptop 502. In the illustrated embodiment, the laptop 502 presents the content 504 associated with a laptop 506 in a movie.

A user may trigger the presentation of the content 504 on the user's laptop 506 by manipulating the laptop 506 represented on the television 118 as described above with respect to FIGS. 1-4. For instance, a user may click on the laptop 506 in the movie to view a screen shot or a video on the user's laptop 502. To accomplish this, the client device 104 may forward the content to the user's laptop 502 so that the user may browse webpages created for the movie. In other instances, the client device 104 outputs a link, e.g., a hypertext markup language (HTML) link that is used by a browser on the user's laptop 502 to access a website that includes the content 504.

The output module 116 may synchronize output of the portions of the stream of content. For example, the output module 116 may delay playback of the video (e.g., video "1" 508) to permit the user's laptop 502 to download content from a website, e.g., the content 504.

A variety of output devices may be used in conjunction with the system 500. Example output devices include mobile phones, computers, and so forth. An auxiliary output device may communicate directly with the client device 104, e.g., through the use of a wireless network cards in the client device 104 and the user's laptop 502.

In other examples, the client device 104 and an output device may communicate via multiple networks and use intermediate devices. Thus, when communicating with a mobile phone, the client device 104 may use the Internet to communicate with server which sends a text message over a cellular network to the user's mobile phone 120.

The user's mobile phone 120 may be identified manually, though use of information included on the mobile phone's subscriber identity module (SIM) card, and so on. For example, the user's mobile phone 120 may identify itself to the client device by broadcasting the phone's short message service (SMS) number so the user's mobile phone 120 may receive telephone calls and text messages from the client device.

Having described the system 500 that may output content via an auxiliary output device, examples procedures are now discussed. As noted previously, the described procedures may be implemented by the environment 100 and systems described in this document and the environment 100 and systems described herein may make use of the following procedures. Although FIG. 6 depicts a procedure 600 that is described in conjunction with the system 500, the procedure 600 may be used in other environments and with other systems.

Figure 6:
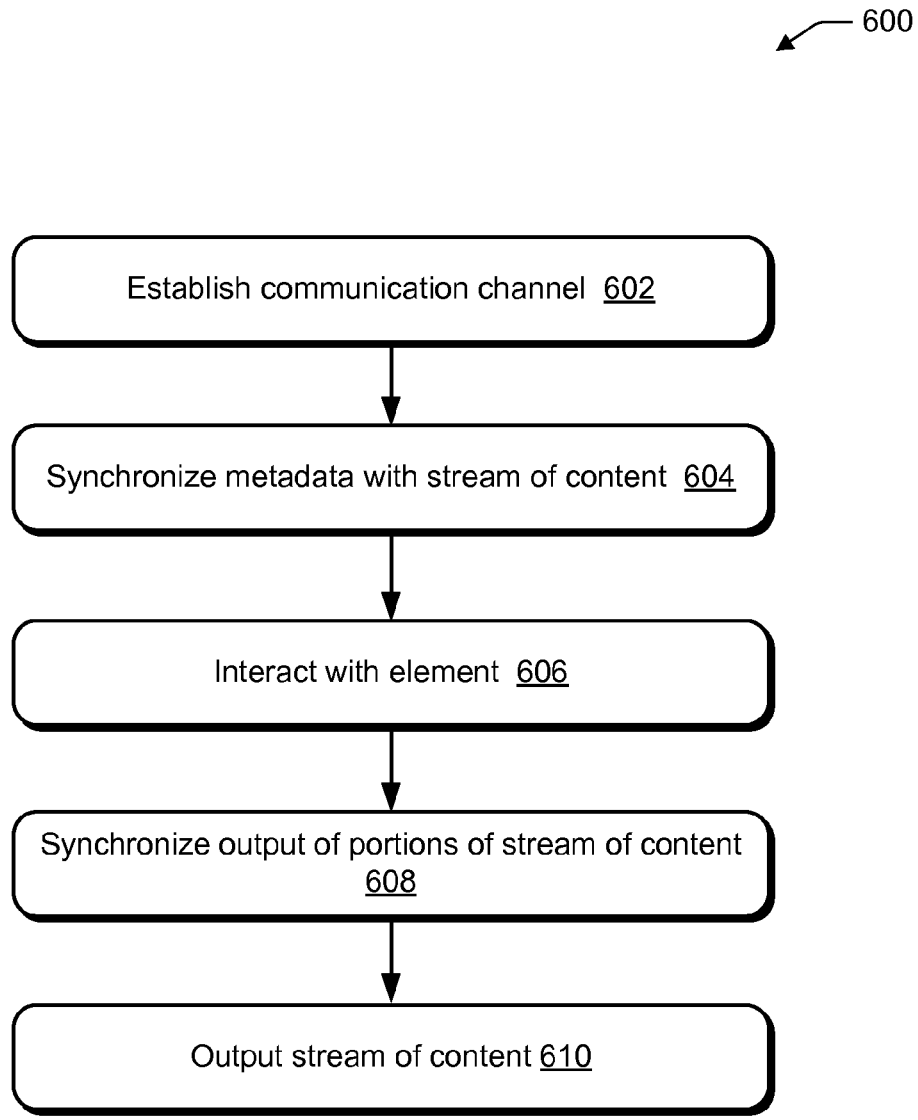
FIG. 6 is a flow diagram depicting a procedure in an example implementation for outputting content from a stream of content for presentation on an auxiliary output device.

FIG. 6 depicts the procedure 600 in which a portion of a stream of content is output for presentation on an auxiliary output device. Another portion of the stream of content may be output to another output device, such as a primary output device. Output of the portions of the stream of content may be synchronized so the portions of the stream are aligned for presentation.

In an embodiment, a communication channel is established (block 602). For example, the client device 104 establishes a communication channel with the user's laptop 502. In this example, the client device 104 may discover which devices are connected to a wireless LAN and establish a communication channel with the discovered devices. In some instances, the client device 104 may establish a communication channel with a server that acts as a go-between with the user's laptop 502.

Metadata, that is associated with an element in the stream of content, is synchronized with the stream of content (block 604). The synchronization engine 110 may synchronize the metadata with the occurrence of the element in the stream of content so the metadata may be used to access the element's underlying behavior.

An input is accepted that interacts with an element (block 606). In this instance, the element is associated with a behavior that causes the output module 116 to output a portion of the stream of content to the auxiliary output device. For example, a user may click on the auxiliary output button 216 so the client device 104 calls the user's mobile phone 120.

Output of the portions of the stream of content are synchronized (block 608). As a result, the client device 104 may output the portions of the stream of content while ensuring presentation of the portions remain aligned. In this way, output of one of the portions of the stream may be delayed in order to align it with another portion of the stream. Thus, the synchronization engine 110 may delay output of a video portion to allow time for a user's laptop to download another portion of the stream of content.

The stream of content is output for presentation (block 610). The client device 104 may output the stream of content to the output device itself, output the stream of content to an intermediary (e.g., a server) that communicates the content. A wide variety of examples are also contemplated.

Having described outputting a portion of a stream of content to an auxiliary output device, presentation of related content that provides context for content in a stream of content (e.g., a scene) is now discussed. As noted above, the systems techniques, approaches, and procedures may be used alone or in conjunction with the previously described environment 100, systems, techniques, approaches, and procedures described above.

Related Content Presentation

Figure 7:
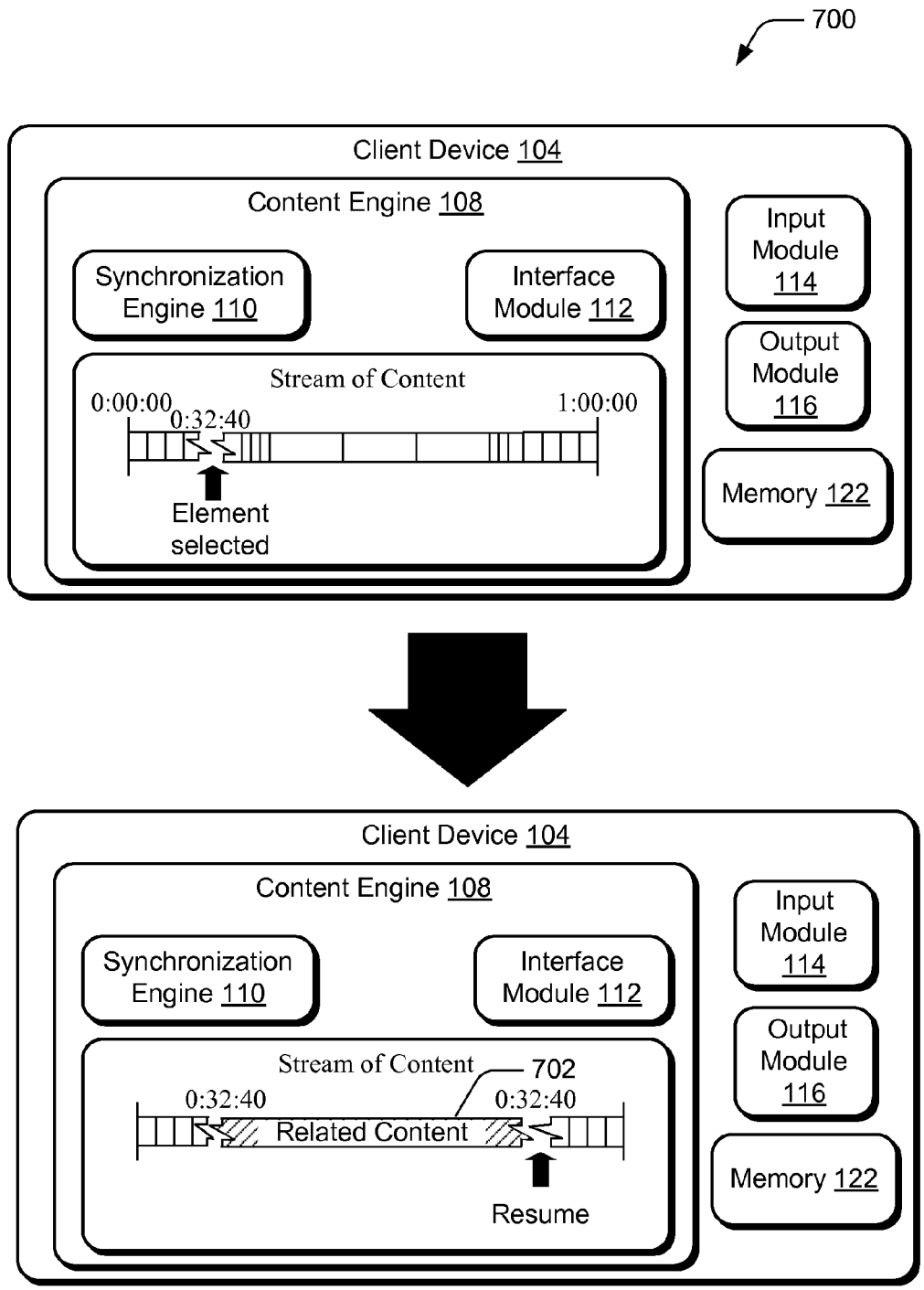
FIG. 7 is an illustration of a system that is used to output related content associated with an element in a stream of content.

FIG. 7 illustrates a system 700 that is configured to output related content 702 associated with a stream of content. The related content may be historical content, such as a flashback. The system 700 may output related content 702 in response to receiving an input that triggers a related content behavior. For example, a user may select an element 704 by clicking on a character to view related content 702 presented from a character's perspective (e.g., a flashback).

In the illustrated embodiment, the synchronization engine 110 synchronizes the metadata that associates the related content 702 with the occurrence of an element in the stream of content. Upon receiving the input, the content engine 108 outputs the related content 702 included in the stream of content.

In an embodiment, the client device 104 obtains the related content 702 in response to a user input. The client device 104 may also obtain the related content 702 in response to the input or obtain the related content 702 (or part of the related content 702) before the user input is received, e.g., pre-fetching the related content 702 into a buffer. In this manner, the content engine 108 may reduce the time associated with switching from the current scene to the related content 702. Thus, the client device 104 may obtain related content for each flashback in a scene so a portion of each of the flashbacks are available for output while the remainder of the selected flashback is obtained in response to the user input.

In an embodiment, the related content 702 is obtained from a different content source than that which provided the stream of content. For instance, the client device may obtain content for a flashback in a movie from a server on the Internet rather than from a DVD that contains the movie.

In an embodiment, the related content 702 is a clip of content, such as one or more of video, audio, web content, and so on. The clip may be content that is referenced by a link included in the metadata or the related content may be a previous portion of the stream of content, e.g., the client device jumps to a previous scene in the stream and then jumps back to the current scene.

After outputting the related content 702, the content engine 108 may automatically resume presentation of the stream of content from the point of interruption, e.g., the point at which the input was received. In other instances, after presenting the related content 702, the content engine 108 may accept user selection of where, within the stream, to start or restart presentation. Thus, a user may start watching the stream of content as if presentation was not halted to present the related content 702. A variety of other examples are also contemplated, further discussion of which may be found in relation to the following procedures.

Figure 8:
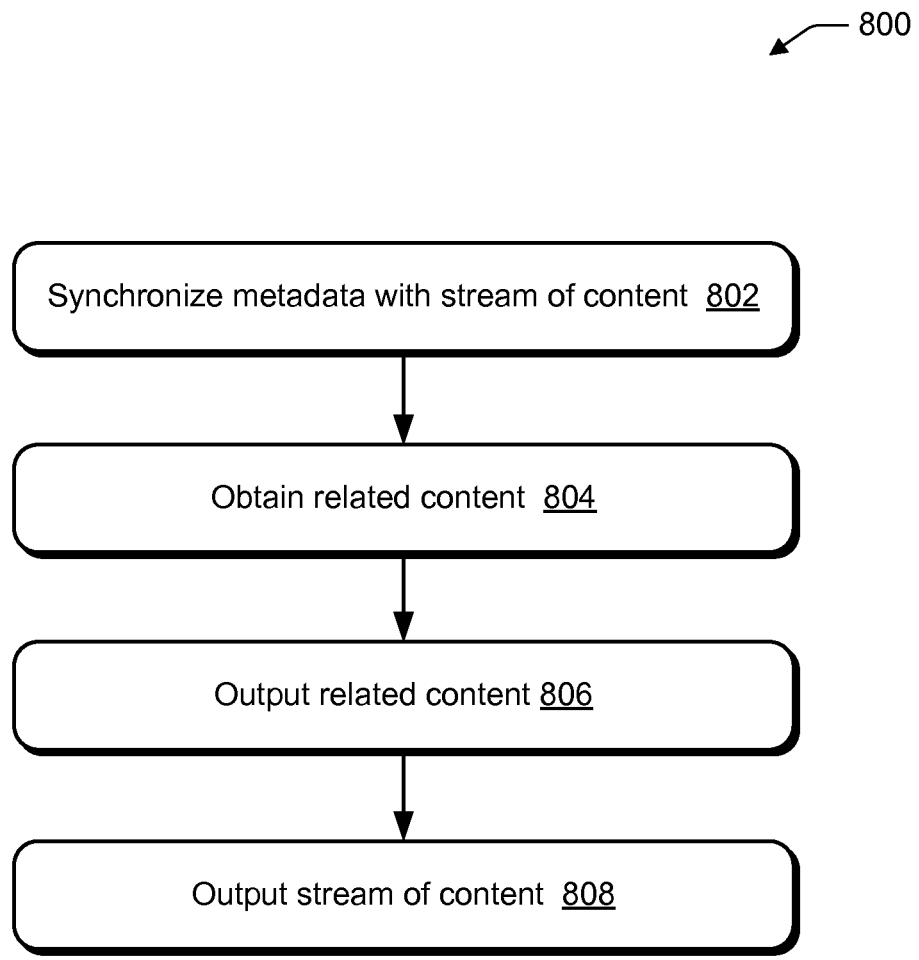
FIG. 8 is a flow diagram depicting a procedure in an example implementation for outputting related content for presentation.

FIG. 8 depicts a procedure 800 for presenting related content associated with a stream of content. The element, in the procedure 800, is backed by code so that a user may interact with the element to view the related content. For example, metadata for the element may reference code that causes the client device 104 to output the related content for presentation on an output device.

Metadata for an element is synchronized with the stream of content (block 802). By synchronizing the metadata to the element's occurrence in the stream of content, the client device 104 may access the behavior to provide the related content.

Related content is obtained (block 804). The related content, or a portion thereof, may be obtained responsive to receipt of a user input that selects the element, pre-fetched, and so on. For example, the client device 104 may obtain the related content from a server on the Internet in response to a user clicking on the element.

The related content is output for presentation (block 806). Thus, the content engine may interrupt output of a current scene to present the related content. In this way, the content engine may halt playback of the stream of content to output the related content.

Output of the stream of content for the current scene is resumed (block 808). Output of the stream of content may be automatically resumed after the related content is output for presentation. Accordingly, the output device may present the related content and then automatically begin presentation of the current scene.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
synchronizing metadata, that is associated with an element, with a stream of content that includes the element, wherein the element is configured to accept an input via an interface layer to access related content that provides context for a scene that includes the element, the interface layer presented over the stream of content and enables interaction with multiple elements included in the stream of content to access customized presentation behaviors associated with the multiple elements that are included as part of multiple scenes of the content, at least one of the multiple elements is accessible to cause a scene in which the at least one element appears for output as part of the scene to be presented from a perspective of the at least one element, the at least one element being selectable from the scene via the interface layer while the at least one element is output as part of the scene, the related content is not output for presentation absent the input via the interface layer to access the related content; and
resuming output of the stream of content, after output of the related content, from a point during playback of the stream of content at which the input was accepted to access the related content.

2. The method as described in claim 1, further comprising providing the interface layer to receive the input to access the related content.

3. The method as described in claim 1, wherein the stream of content is obtained from one or more of a cable television system, an online content system, a satellite, an on-demand video system, a digital video disk, or stored in memory.

4. The method as described in claim 1, wherein the related content comprises a flashback.

5. The method as described in claim 1, wherein the related content is included in the stream of content.

6. The method as described in claim 1, wherein the related content is associated with the element by a link included in the metadata.

7. A system comprising:
an interface module configured to receive an input directed to an element that is included in a stream of content to control whether portions of the stream of content are to be directed to a primary output device or an auxiliary output device that is separate from the primary output device, the input being received via an interface layer that is presented over the stream of content and includes an indication that appears over the element and indicates that the element is selectable from a scene in which the element appears to access customized presentation behaviors associated with the element; and
an output module configured to output a portion of the stream of content that corresponds to an auxiliary perspective to the auxiliary output device responsive to receipt of an input, the auxiliary perspective that is to be output to the auxiliary device is different from a primary perspective that is to be output to the primary device and the output module is further configured to synchronize the output of the portion of the stream of content with output of at least one other portion of the stream of content that corresponds to the primary perspective to the primary output device.

8. The system as described in claim 7, wherein the portion of the stream of content is not scheduled to be output by the primary output device.

9. The system as described in claim 7, wherein the output module is configured to communicate with a server to provide the portion of the stream content to the auxiliary output device.

10. The system as described in claim 9, wherein the output module is configured to provide a short message service (SMS) number associated with the auxiliary output device to the server.

11. The system as described in claim 7, wherein the auxiliary output device comprises one or more of a mobile phone or a computing system.

12. The system as described in claim 7, wherein the portion of the stream of content comprises audio for a telephone conversation.

13. The system as described in claim 7, wherein the system comprises one or more of a cable television receiver, an online content system, a video game console, a satellite receiver, or a video console.

14. One or more computer-readable storage devices comprising instructions, that responsive to being executed by a computing system, cause the computing system to perform operations comprising:
  synchronizing metadata associated with an element with a stream of content that includes the element, the element appearing in a scene of the content and configured to accept an input to control from what perspective the stream of content is to be output; and
  outputting the stream of content from an auxiliary perspective, responsive to receipt of an input that involves selection of the element from the scene of the content while the scene is output from a primary perspective and that is effective to interact with the element to select the auxiliary perspective, the auxiliary perspective comprising a perspective of the element such that the scene in which the element appears is presented from the perspective of the element in lieu of from the primary perspective, the stream of content is output from the primary perspective and not from the selected auxiliary perspective absent the input that interacts with the element to select the auxiliary perspective, the stream of content is output differently from the primary perspective than from the auxiliary perspective.

15. One or more computer-readable storage devices as described in claim 14, wherein the auxiliary perspective comprises one or more of a visual perspective from which the stream of content is to be presented.

16. One or more computer-readable storage devices as described in claim 14, wherein the auxiliary perspective comprises one or more of a visual or an audio perspective for a character represented in the stream of content.

17. One or more computer-readable storage devices as described in claim 14, wherein the operations further comprise providing an interface layer to receive the input directed to the element.

18. One or more computer-readable storage devices as described in claim 14, wherein the stream of content comprises an audio-visual program.

19. One or more computer-readable storage devices as described in claim 14, wherein the stream of content comprises one or more of a movie, a television show, or a webcast.

20. One or more computer-readable storage devices as described in claim 14, wherein the auxiliary perspective comprises a camera angle represented in the stream of content.

\* \* \* \* \*